INVENTOR
WILLIAM M. KARLYN
BY,
Kenway, Jenney, + Hildreth
ATTORNEYS

April 25, 1967 W. M. KARLYN 3,315,779
SYNCHRONIZED AUTOMATIC DECORATING AND DRYING APPARATUS
Filed Aug. 12, 1965 4 Sheets-Sheet 4
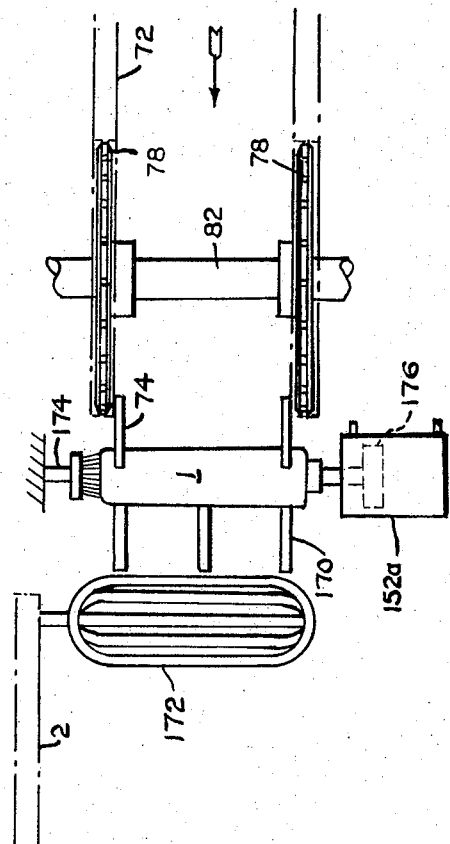
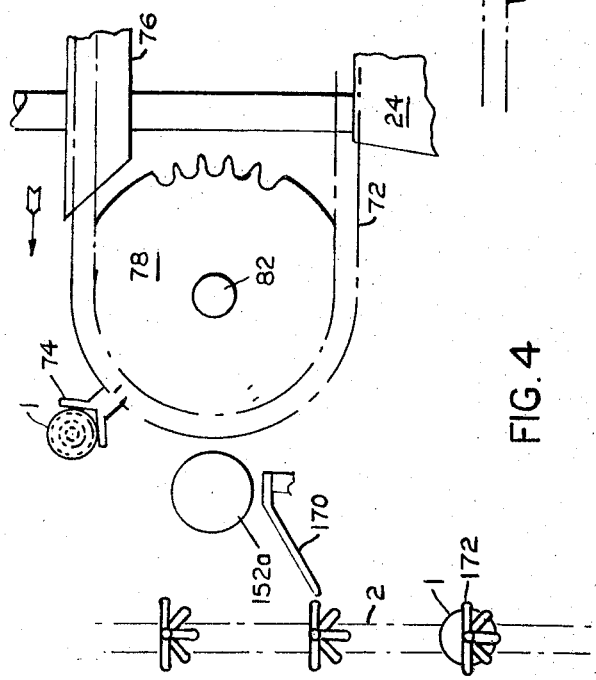
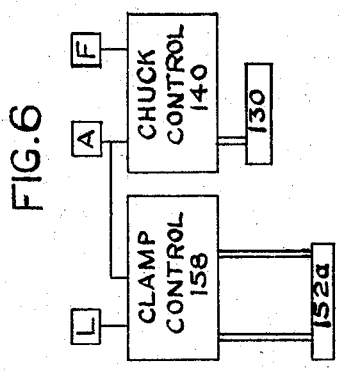
INVENTOR
WILLIAM M. KARLYN
BY,
*Kenway, Jenney, & Hildreth*
ATTORNEYS

United States Patent Office 3,315,779
Patented Apr. 25, 1967

3,315,779
SYNCHRONIZED AUTOMATIC DECORATING AND DRYING APPARATUS
William M. Karlyn, 18 Merritt St.,
Marblehead, Mass. 01945
Filed Aug. 12, 1965, Ser. No. 479,241
4 Claims. (Cl. 198—20)

This invention relates to an improved synchronized automatic decorating and drying apparatus, of a type which applies designs or printing in a liquid medium to a succession of articles carried on a first conveyor, and then transfers the articles to a second conveyor for passage through a drying oven.

The nature of conventional wet decorating process requires that the first or decorating conveyor advance the articles to and from a decorating station in intermittent discrete steps, as the articles must be halted during the intervals required for decoration. According to conventional practice, however, the second or oven conveyor advances continuously, at a predetermined rate of speed; this rate is usually adjustable to afford the maximum production rate consistent with thorough drying of the liquid decorating medium. A fixed interval of advance of the decorating conveyor could synchronize the rate of delivery of wet decorated articles with a fixed rate of advance of the oven conveyor, if the rates of both conveyors were constant. However, the time required for drying different articles with various designs is not constant; and in order to secure the maximum production, the oven and decorating conveyor rates must be adjustable. However, it is most difficult to manually adjust the intervals of advance of the decorating conveyor to synchronize with a variable rate of continuous advance of the oven conveyor; the production rate is correspondingly likely to be less than the maximum consistent with the particular speed chosen for the oven conveyor.

To prevent contact of the wet surfaces of the articles with one another or with the mechanism, the conveyors are provided with a series of article carriers designed to support the articles individually, and at points outside their decorated areas. The difficulty of synchronizing the intermittent drive of the decorating conveyor with the continuous drive of the oven conveyor is further complicated by the necessity for transferring wet articles from the carriers of one to those of the other, since successive pairs of these carriers must be properly aligned at a transfer station. A small error in the relative speed setting is accumulative, and any misalignment between the respective carriers at the transfer station increases progressively when such an error occurs.

It is the primary object of the present invention to afford an improved synchronized decorating and drying apparatus. It is a further object to secure the maximum rate of production of decorated articles consistent with an adjustable preselected speed of a continuously-advancing oven conveyor, by synchronizing the operation of a decorating apparatus including an intermittently-advancing conveyor. It is a further object to synchronize an intermittently-advancing decorating conveyor with a continuously-advancing oven conveyor, for proper transfer of treated articles from one to the other. It is another object to synchronize the advancement of spaced carriers on separate conveyors to insure proper alignment at a transfer station for delivery of articles from the carriers of one to those of the other. It is another object to provide improved transfer means for delivering articles from carriers of one conveyor to carriers of another. Additional objects and advantages of the invention will become apparent as the following description proceeds. Generally stated, I may carry out my invention in part by governing the intermittent advance of successive articles through a decorating station by a first or decorating conveyor, and the operations of associated decorating apparatus, in response to the passage of successive articles through a sensing station, spaced along the path of a second continuously-moving oven conveyor. Preferably, the sensing means comprises a lever-actuated switch positioned for engagement by successive articles borne by the carrier of the oven conveyor, and incorporated into a control circuit which governs the intermittent advance or indexing of the decorating conveyor. The oven conveyor is continuously advanced by an adjustable speed drive so that its rate may be set at a maximum consistent with proper drying; and since the rate of advance governs the indexing interval of the decorating conveyor, the selection of a speed setting for the oven conveyor automatically regulates the operation of the decorating conveyor to cause articles to be decorated and delivered in synchronism with the advancement of the oven conveyor.

Thus, the decorating and delivery of wet articles to the oven is carried on at the precise rate at which the speed of the oven conveyor prepares the oven to receive them. Although the speed of the oven conveyor may be readjusted, the decorating operations are automatically synchronized at all times.

Articles are transferred from the first to the second conveyor at a delivery station located between the decorating and sensing stations. Each of the conveyors is provided, in a preferred embodiment, with series of spaced carriers for supporting individual articles at points other than the decorated areas, to prevent smearing by contact with other objects. Transfer means are arranged at the delivery station, to remove the articles successively from the carriers of the decorating conveyor, and deliver them to the carriers of the oven conveyor. The synchronizing control system also insures the arrival in proper article-transfer alignment of the successive carriers of both conveyors at the delivery station.

The operations of the decorating conveyor and apparatus may be governed by a control circuit which may be essentially similar to that shown in my copending patent application Ser. No. 447,606, entitled, "Automatic Decorating Apparatus for Open-Ended Articles," filed Apr. 5, 1965, which is a continuation-in-part of application Ser. No. 391,249, filed Aug. 21, 1964, and now abandoned: this control circuit is modified as necessary to suit the particular decorating process and the type of article to be treated. In this cycle, successive operations are initiated by the completion of machine movements involved in a preceding step. I insert the article-sensing switch means associated with the oven conveyor, into this control system at the point of conveyor indexing, so that the complete cycle of the decorating conveyor and apparatus is governed by the rate of passage of articles through the oven.

I also provide improved article transfer means for removing articles from the carriers of the decorating conveyor and positioning them properly on the carriers of the oven conveyor. Delivery of articles is synchronized with the arrival of carriers in alignment at the transfer station, by governing the operations of the transfer means in response to the indexing of the oven conveyor, and the arrival of articles on the oven conveyor at the sensing station.

While the specification concludes with claims particularly pointing out the subject matter which I regard as my invention, it is believed that a clearer understanding may be gained from the following detailed description of preferred embodiments thereof, referring to the accompanying drawings, in which:

FIG. 4 is a fragmentary view in front elevation showing a modified apparatus for decorating articles having closed ends;

FIG. 5 is a fragmentary plan view of the apparatus of FIG. 4; and

FIG. 6 is a partial schematic diagram showing modified portions of the control circuitry of FIG. 3, for use with the apparatus of FIGS. 4 and 5.

Figure 1:
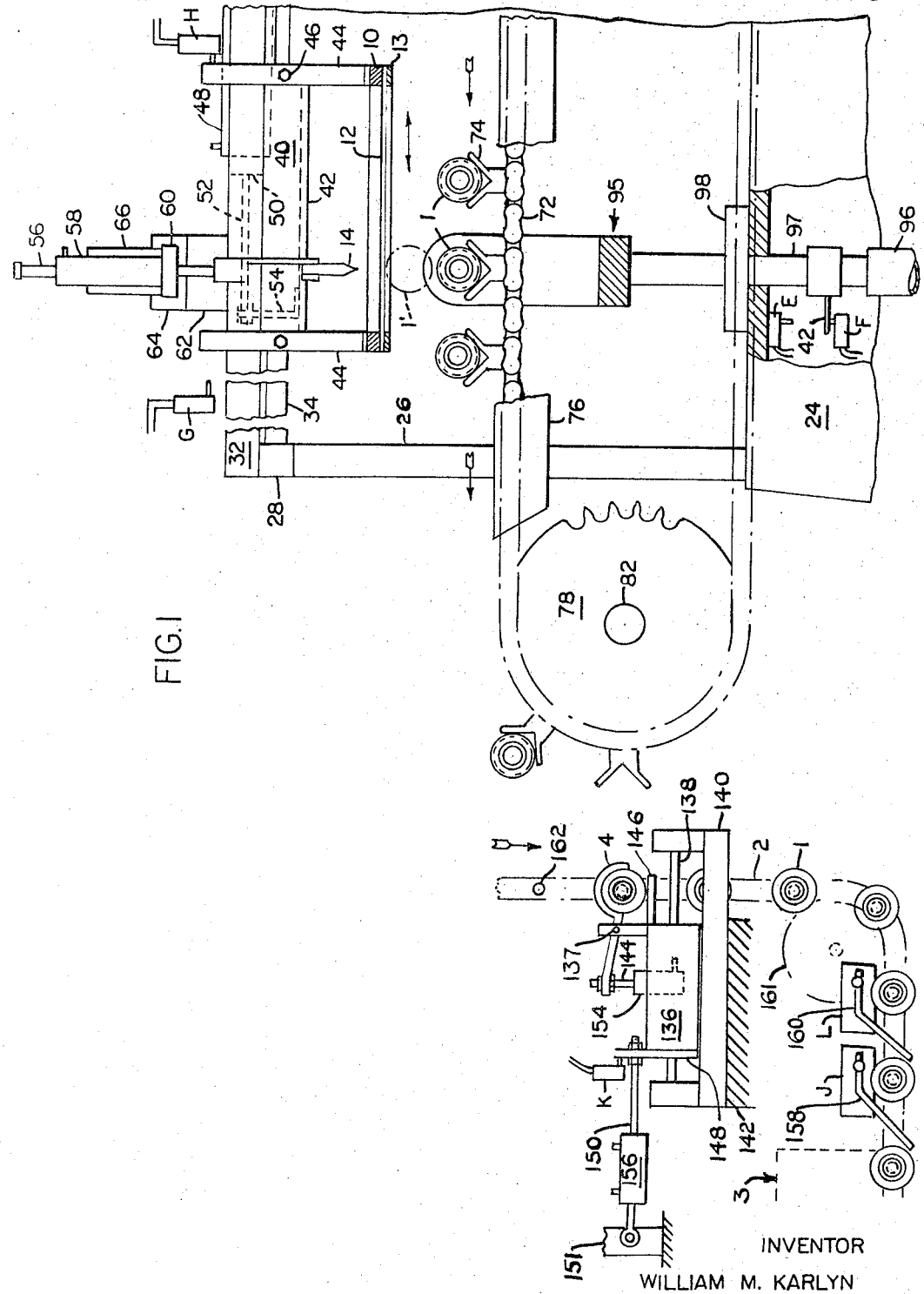
FIG. 1 is a fragmentary view in front elevation, and partially in section, of an illustrative embodiment of the invention in which decoration of open-ended articles is performed by a silk screen stencilling process.
Figure 2:
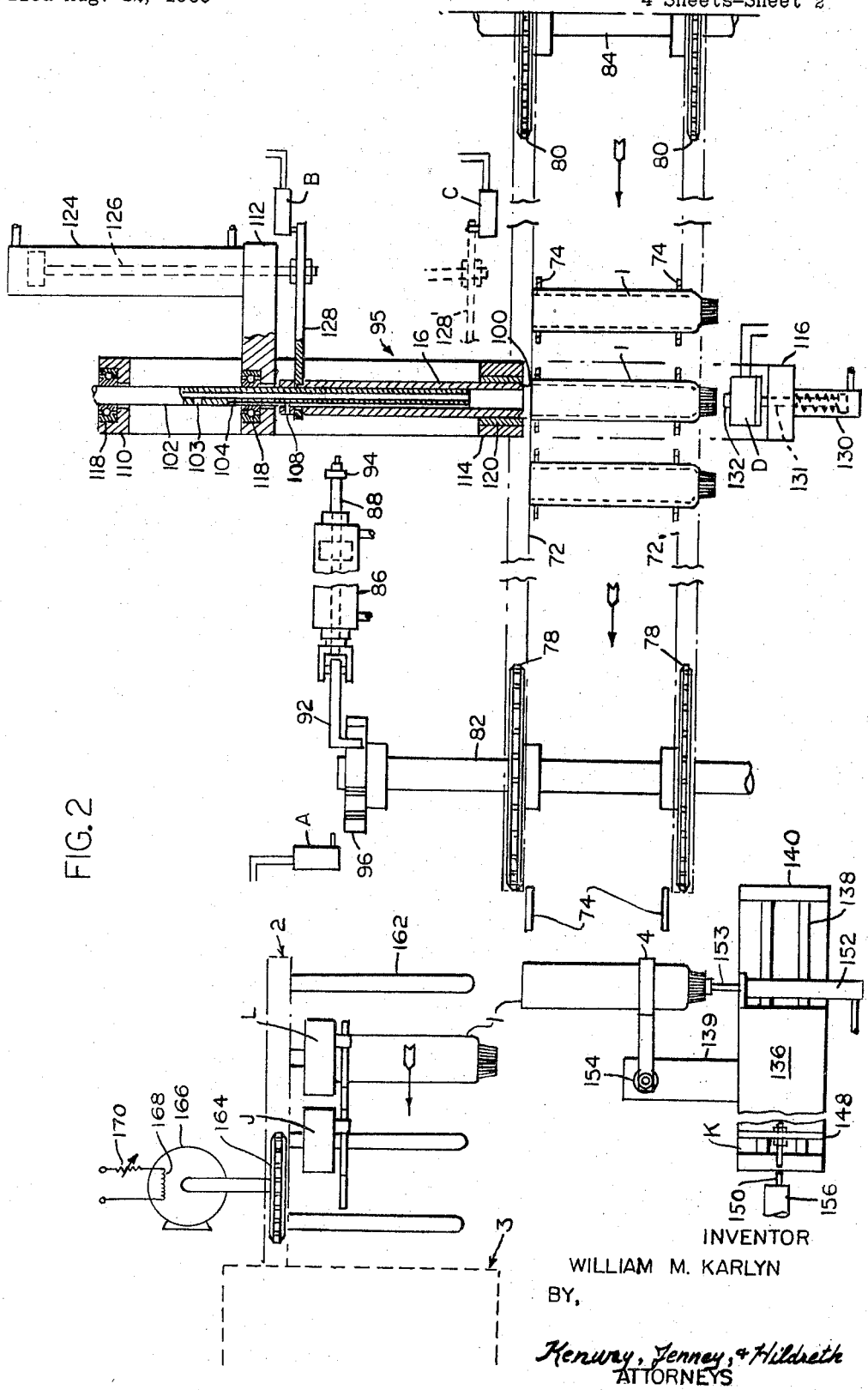
FIG. 2 is a fragmentary plan view, partially in section, of the apparatus of FIG. 1.
Figure 3:
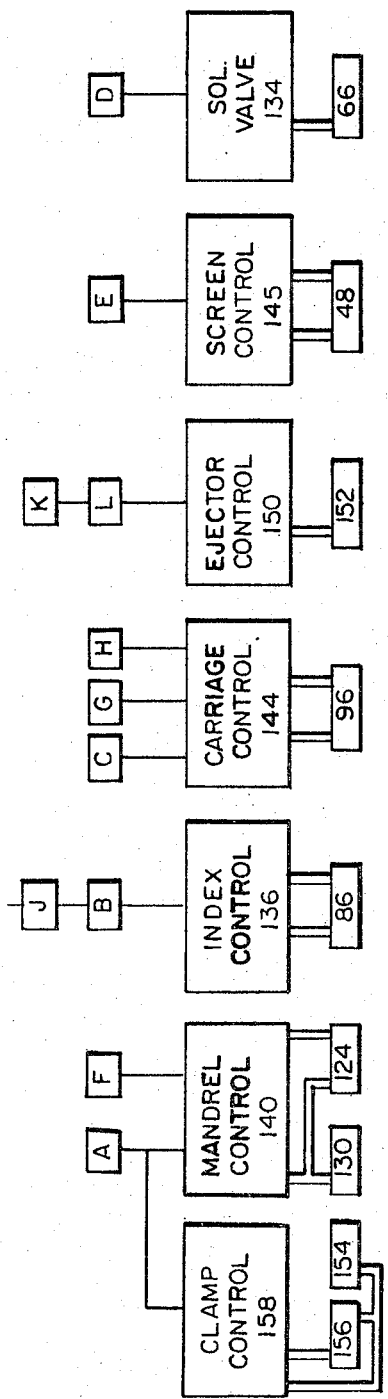
FIG. 3 is a schematic diagram of control circuitry for the apparatus.

Referring to FIGS. 1–3, a first embodiment is shown for use on articles 1 comprising incomplete tubes, each having an open end. Articles of this kind are commonly filled prior to closing of the open end to form a squeeze tube. The apparatus generally comprises a first or decorating conveyor 72; a silk screen decorating apparatus including a screen 12; a second or oven conveyor 2 for carrying pins 162 bearing wet decorated articles through an oven 3 having suitable heating means (not shown) for drying the articles; and transfer means including a clamping element 4 for removing successive articles from the conveyor 72 at a delivery station, and loading them on the conveyor 2.

The stencilling mechanism shown is similar to that described by my aforementioned application Ser. No. 447,606, and comprises a frame 10 arranged to support the silk screen 12, which is mounted in a base 13; a rubber squeegee 14 for engagement with an upper surface of the silk screen; and a mandrel 16 for rotatably engaging successive articles 1 with the lower surface of the screen, in vertical alignment with the squeegee. By translating the screen and its supporting frame in either direction, after applying a pool of suitable paint to the upper surface of the screen, a stencil pattern may be applied to the outer surface of each successive article.

The stencilling apparatus is organized about a supporting structure which includes a base 24 for enclosing control elements, vertical standards 26, horizontal transverse braces 28, and longitudinal braces 32. Cylindrical guide rods 34 are secured at their opposite ends in the braces 28, for slidably supporting the screen frame 10 in the directions of reciprocation shown by the arrows in FIG. 1.

The screen frame is supported cantilever-fashion by a sliding assembly which includes a pair of slide bars 40 mounted for reciprocation on the guide rods 34, and a pair of cantilever arms 44 secured by screws 46. Reciprocatory movement of the frame and its supporting assembly is obtained by means of a double-acting pneumatic motor 48, mounted on the stationary braces 32 by a transverse bar 50, and having its piston rod 52 connected to the sliding assembly by means of a bracket 54.

The squeegee 14 is of a conventional type, and is mounted by a yoke 56 for reciprocation in bearing housings 58, which may contain ball bushings (not shown) for maintaining proper alignment of the squeegee. The housings are supported on the frame by means of a cantilevered bracket 60 and a framework comprising plates 62 and 64. A single-acting spring-return pneumatic motor 66 is connected to the yoke 56 for reciprocation of the squeegee to and from pressure engagement with the upper surface of the screen 12.

A series of articles 1 are carried in the direction shown by arrows in FIG. 1 to and from a decorating station aligned vertically beneath the squeegee, by means of the conveyor 72, each chain of which carries a series of carriers 74 comprising V-shaped forks, for supporting the series of articles in aligned relationship. Channeled guides 76 are provided to maintain proper alignment of the rectilinear runs of the chains, and the chains are driven and guided by pairs of sprockets 78 and 80, which are mounted on a drive shaft 82 and an idler shaft 84, respectively. The conveyor is driven intermittently in discrete indexing steps to bring each successive bottle to the decorating station for stencilling, and subsequently to remove it for delivery. While various indexing mechanisms may be utilized for this purpose, the illustrated device (FIG. 2) includes a double-acting air motor 86, whose piston rod 88 carries a pivoted pawl 92 for driving a ratchet 96 affixed to the drive shaft. The movement is limited by an adjustable stop 94 affixed to the piston rod.

For automatically stencilling the succesive articles, it is necessary to raise each successive article from the pick-up station into pressure contact with the screen surface, to support it in rolling engagement therewith during the translation of the screen, and to restore it to the conveyor. This is accomplished by reciprocably and rotatably supporting the mandrel in a carriage 95, which is itself vertically reciprocable to raise and lower the mandrel and the article mounted thereon. The raised position of the article is shown in dotted lines at 1' in FIG. 1. Elevation of the carriage is brought about by means of a double-acting pneumatic motor 96 mounted in the cabinet 24, and having its piston rod 97 connected to the carriage by a yoke 98.

The mandrel 16 has a tapered nose 100 to insure proper alignment with the interior surface of the article on injection, and is of hollow tubular form, being slidable upon a tubular drive shaft 102. A relief port 103 communicates the tubular shaft and mandrel with the atmosphere for the relief of air pressure from the article as the mandrel is injected. Rotational driving connection and alignment between the mandrel and shaft are maintained by a keyway 104 and key 108.

The carriage 95 has a series of upstanding standards 110, 112, 114, and 116. In the first two of these, bearings 118 are provided for rotatably mounting the drive shaft, while the standard 114 contains a plain bearing 120 of nylon, Teflon, or other material suitable for guiding the nose of the mandrel. This bearing also serves to restrain the article in place on the conveyor as the mandrel is withdrawn.

Reciprocation of the mandrel between the position injected into the article and the withdrawn position is secured by a double-acting pneumatic motor 124 mounted on the standard 112, and having its piston rod 126 drivingly connected with the mandrel by means of an arm 128.

Upon injection of the mandrel into the article, it is necessary to restrain the latter, and for this purpose a single acting spring-return pneumatic motor 130 is mounted in the standard 116, and its piston rod 131 carries a movable stop 132. The stop forms the actuating element for a normally-open switch D, whose purpose it is to prevent the lowering of the squeegee 14 at any time that an article 1 is not present in the pick-up station to depress the stop 132. Otherwise, the mandrel could rise into stencilling position without an article, and the consequent painting of its surface would smear the interiors of subsequently-treated articles.

In the treatment of open-ended articles, the carriers of the oven conveyor 2 conveniently consist of pins 162 receivable interiorly of the articles. The transfer means must grasp each article as the conveyor 72 indexes it to the delivery station, and place it on a longitudinally spaced-apart pin 162. The illustrated transfer means include a clamping element 4 slidable along a fixed path, defined by guide rods 138 and a slide block 136, on which the clamping element is pivotally mounted as at 137. The rods 138 are supported in a bed 140, which is in turn mounted on a frame member 142. The clamping element 4 is actuable by the piston rod 144 of a spring-return pneumatic motor 154, mounted on the slide block 136; and is adapted to grip an article against an arm 146 extending from the slide block.

The slide block has a plate 148 connecting it for actuation by the piston rod 150 of a double-acting pneumatic motor 156, which is mounted on a frame member 151.

The clamp is reciprocable between an advanced position for gripping an article supported at the delivery station by a pair of the carriers 74, and the illustrated position in which the article is longitudinally aligned with one of the pins 162. Arriving at this position, the article is ejected from the clamp by the piston rod 53 of a single-acting spring-return pneumatic motor 152, with sufficient force to insure that it reaches a fully-telescoped relation on the pin. It is then carried through the oven 3 by the conveyor 2.

The oven conveyor 2 is guided about idler sprockets such as illustrated at 161, and is driven by a sprocket 164 and a variable-speed motor 166, whose field 168 is adjustable by means of a rheostat 70, or is otherwise variable in speed in any conventional manner. Thus, the rate of speed of the oven conveyor can be adjusted for the required drying time.

According to the invention, variation in the speed of the oven conveyor is accompanied by automatic adjustment of the operations of the decorating apparatus and conveyor 72, so as to maintain a synchronized operation at the maximum rate permitted by the required drying time; the conveyors are also automatically synchronized for proper transfer of articles from one to the other. This is accomplished in part by providing a sensing switch J located at a sensing station along the path of the oven conveyor, and having an actuating arm 158 which closes the switch each time an article or a pin 162 passes this station. In the preferred form shown, a similar switch L is arranged at another sensing station, having its actuating arm 160 also interposed in the path of articles borne by the conveyor. A number of additional switches are provided to signal the completion of various sequentially-performed machine operations, and their physical arrangement is shown in FIGS. 1 and 2; the operation of the control mechanism incorporating these switches will now be described, with reference also to FIG. 3.

At the commencement of the operation of the machine, the oven conveyor 2 is set in motion by the motor 166. At the same time, with the mandrel 16 in the withdrawn position as illustrated, a normally-open switch B is closed by the arm 128, and actuates a control 136 upon the actuation of the normally-open series connected sensing switch J, by the first passage of an article 1 on the conveyor 2. The switch J synchronizes the rate of recurrence of indexing movements, and thus the cycle of decorating operation, with the rate of passage of articles through the oven conveyor. The switch B insures that the mandrel is in a safely-withdrawn position from the path of the oncoming article on the decorating conveyor. The indexing control 136 may comprise a solenoid-actuated valve, which supplies pressure fluid from a suitable source to drive the motor 86 and the ratchet 96 through an indexing cycle, and thus advance the next succeeding article to the pick-up station.

The indexing movement actuates a switch A, which is connected through another control 140 to actuate the mandrel motor 124 and a stop motor 130, thus injecting the mandrel into an article in the pick-up station. At the same time, the switch D is closed by this article, and energizes a solenoid valve 134 for actuating the squeegee motor 66 downwardly. The switch F reverses the control 140 when actuated by the raising and subsequent lowering of the carriage 95, which carries a switch-actuating lever 42 for this purpose. Reversal of the control 140 then reverses the motors 124 and 130 to withdraw the mandrel 16 and stop 132 from the decorated article.

As the switch A is actuated by an indexing movement, it also energizes a clamp control 158, which may comprise a four-way solenoid air valve, to supply pressure fluid to the motor 156. This motor drives the slide block 136 forwardly to pick up an article just arriving in aligned position at the delivery station. The release of the switch A occurs immediately, as the indexing motor 86 is reversed upon the release of the switch B by the forwardly-driving mandrel motor 124; and the clamp control is thus reversed to withdraw the slide block 136 toward the position shown in the drawings.

The motor 154 is connected to the return pressure line of the motor 156, and thus actuates the clamping element to grip an article immediately upon the reversal of the clamp control 158. The clamping element remains in a closed position until the clamp control is again reversed by a new indexing movement and actuation of the switch A.

Ejection of the clamped article is timed with the arrival of one of the pins 162 in aligned relation, by controlling the ejector motor 152 through an ejector control 150 actuated by series-connected switches K and L. The switch K is actuated by a connecting plate 148 attached to the slide block 136, to insure the withdrawal of the article to a horizontally-aligned position; while the switch L is actuated by the passage of an article on the conveyor, signaling the vertical alignment of a pin 162 in position to receive the ejected article. It is to be noted that the arm 160 of the switch L is spaced from the axis of the ejector piston 153 an even multiple of the spacing between the pins 162.

As the mandrel 16 reaches the injected position, the arm 128 reaches a position at 128' (FIG. 2) to actuate a switch C, thereby to initiate upward movement of the carriage motor 96 through a control 144, and raise the carriage with the mandrel-injected article toward a stencilling position 1' (FIG. 1). As the carriage reaches this position, the lever 42 strikes a switch E, reversing the screen frame toward the opposite terminal position from the one it then occupies. As the screen frame translates, the stencil pattern is transferred to the article surface in rolling contact therewith, by the wiping of a pool of paint on the upper screen surface by the squeegee 14. At the conclusion of the stroke, the frame is halted by a suitable stop (not shown), and strikes one of a pair of limit switches G or H, one being arranged at each terminal of the screen stroke. This causes the carriage motor 96 to reverse, carrying the stencilled article with the carriage back to the decorating station. Descent of the carriage actuates the switch F to withdraw the mandrel and initiate a new indexing movement and cycle of decoration.

A modified form of transfer means is shown in FIGS. 4 and 5, for use with articles having either open or closed ends. Articles of this nature are transported on the oven conveyor 2 by basket carriers 172. The clamping element 4 and the ejector piston 153 of the preceding embodiment, are replaced by an ejector piston 176 of a double-acting pneumatic motor 152a. This piston clamps an article, borne to the delivery station by the carriers 74 of the decorating conveyor 72, against a stop 174. When released by withdrawal of the piston 176, the article rolls along a chute 170 into a waiting basket 172.

The control circuit is somewhat modified in this embodiment, as shown in FIG. 6. Inasmuch as the articles have closed ends, a chuck (not shown), similar to the stop 132 of the preceding embodiment, is actuated by a single-acting motor 130 to hold the articles for decoration. The switches A and F energize a chuck control 140 to actuate the motor 130 in a manner similar to that described with reference to FIG. 3. The clamp control 158 is again actuated by the switch A concurrently with an indexing movement, but in this case drives the piston 176 forwardly to clamp an article which is passed to the delivery station by the indexing. The sensing switch L acts to reverse the clamp control 158 coincidentally with the arrival of a basket 172 in aligned relationship to the chute 170, so that air pressure is applied to the motor 152a to withdraw the piston 176 at this juncture. The separate ejector control 150 of the preceding embodiment is omitted. The remainder of the apparatus and control circuitry are like those of the preceding embodiment.

Various changes and modifications in the details of

What I claim is:

1. Apparatus for automatically decorating and drying each of a series of articles, comprising, in combination: decorating means; a first conveyor for advancing successive articles to a decorating station, in which an article is positioned for decoration by said decorating means, and thence to a delivery station; said first conveyor including article carriers spaced apart uniformly, said delivery station being spaced from said decorating station a multiple of the spacing between adjacent carriers; an oven; a second conveyor extending adjacent to said delivery station for receiving articles from said first conveyor, and thence through said oven; said second conveyor including article carriers spaced apart uniformly thereon; means for transferring articles from an article carrier of said first conveyor at said delivery station to an article carrier of said second conveyor; drive means for continuously advancing said second conveyor; indexing means for intermittently advancing said first conveyor in discrete steps of a length equal to the spacing between adjacent carriers thereon, to position successive carriers at said delivery station; and sensing means positioned along the path of said second conveyor a distance from said transfer means which is a multiple of the spacing between carriers on said second conveyor, and being constructed and arranged to operate said indexing means and said transfer means to deliver an article from a carrier of said first conveyor to a carrier of said second conveyor upon passage of each successive article past said sensing means; whereby the rate of decoration and delivery of articles to said second conveyor is synchronized with the rate of arrival of carriers of said second conveyor in position to receive articles from said transfer means.

2. Apparatus as recited in claim 1, in which said transfer means comprises a movable clamp and motive means for shifting said clamp between a first position aligned at said delivery station with a carrier of said first conveyor for clamping an article supported thereon, and a second position aligned with said second conveyor for delivering the clamped article thereto; together with control means for said motive means responsive to operation of said indexing means to drive said clamp to said first position, and to return said clamp to said second position upon completion of operation of said indexing means.

3. Apparatus as recited in claim 2, in which said transfer means includes ejector means for delivering an article from said clamp to a carrier of said second conveyor; said sensing means being constructed and arranged to actuate said ejector means coincident with the arrival of a carrier of said second conveyor in aligned relation with said clamp in said second position thereof, for receiving the ejected article.

4. Apparatus as recited in claim 1, in which said transfer means comprises clamping means aligned at said delivery station with the carriers of said first conveyor to grasp articles therefrom, and means for effecting transfer of articles, upon their releases by said clamp, to carriers of said second conveyor; together with control means for said clamping means responsive to operation of said indexing means to close said clamping means coincident with the arrival of an article in aligned relation therewith at said delivery station; said sensing means being constructed and arranged to open said clamping means upon passage of an article thereby; whereby the clamping means releases a clamped article conicident with the arrival of a carrier of said second conveyor in a position aligned for receiving the release article.

References Cited by the Examiner

UNITED STATES PATENTS

| | | | |
|---|---|---|---|
| 1,910,713 | 5/1933 | Prussing | 118—58 X |
| 2,800,872 | 7/1957 | Remington et al. | 118—58 |
| 3,024,887 | 3/1962 | Ingham | 198—21 |
| 3,182,589 | 5/1965 | Green et al. | 118—58 |

EVON C. BLUNK, *Primary Examiner.*

A. C. HODGSON, *Assistant Examiner.*